(12) United States Patent
Radhakrishnan et al.

(10) Patent No.: US 9,239,177 B2
(45) Date of Patent: Jan. 19, 2016

(54) HYBRID ABSORPTION-COMPRESSION CHILLER

(75) Inventors: Balu Radhakrishnan, Maharashtra (IN); Babu Panneerselvam, Tamil Nadu (IN); Shanmugamuthukumar Sivakaminathan, Tamil Nadu (IN)

(73) Assignee: THERMAX LIMITED, Maharashtra (IN)

( * ) Notice: Subject to any disclaimer, the term of this patent is extended or adjusted under 35 U.S.C. 154(b) by 191 days.

(21) Appl. No.: 13/976,140

(22) PCT Filed: Nov. 29, 2011

(86) PCT No.: PCT/IN2011/000819
§ 371 (c)(1),
(2), (4) Date: Jun. 26, 2013

(87) PCT Pub. No.: WO2012/090217
PCT Pub. Date: Jul. 5, 2012

(65) Prior Publication Data
US 2013/0269373 A1    Oct. 17, 2013

(30) Foreign Application Priority Data
Dec. 27, 2010    (IN) .................. 3547/MUM/2010

(51) Int. Cl.
*F25B 29/00* (2006.01)
*F25B 25/02* (2006.01)

(52) U.S. Cl.
CPC .................. *F25B 25/02* (2013.01)

(58) Field of Classification Search
CPC ........................................... F25B 25/02
See application file for complete search history.

(56) References Cited

U.S. PATENT DOCUMENTS

| | | | | |
|---|---|---|---|---|
| 3,301,000 | A | * | 1/1967 | Holbay ........... F25B 25/02 62/116 |
| 3,824,804 | A | | 7/1974 | Sandmark |
| 5,018,367 | A | * | 5/1991 | Yamada ............ F25B 25/02 62/335 |
| 5,934,101 | A | * | 8/1999 | Takaki ............. F25B 25/02 62/476 |
| 7,624,588 | B2 | | 12/2009 | Kim et al. |
| 7,765,823 | B2 | | 8/2010 | Shiflett et al. |
| 2007/0019708 | A1 | * | 1/2007 | Shiflett et al. ......... 374/181 |
| 2007/0204638 | A1 | * | 9/2007 | Kim ................ F25B 15/008 62/238.3 |
| 2010/0270005 | A1 | * | 10/2010 | Radhakrishnan .... F25B 15/008 165/62 |

* cited by examiner

*Primary Examiner* — Emmanuel Duke
(74) *Attorney, Agent, or Firm* — Cowan, Liebowitz & Latman, P.C.; Mark Montague

(57) ABSTRACT

The present invention envisages a hybrid absorption-compression chiller comprising: a vapor-compression system providing refrigeration effect in a primary evaporator (102*a*) by extracting heat from a medium to be cooled in a condensed primary refrigerant, and a vapor-absorption system in operative communication with the vapor-compression system for receiving primary refrigerant vapors via a compressor (104*a*), these vapors are cooled by a condensed secondary refrigerant in a secondary evaporator (106*a*) to provide cold condensed primary refrigerant which is recycled to the vapor-compression system. The hybrid absorption-compression chiller of the present invention is energy-efficient and provides a higher COP in comparison with the conventional chillers.

14 Claims, 4 Drawing Sheets

HYBRID ABSORPTION-COMPRESSION CHILLER

FIELD OF INVENTION

This invention relates to hybrid absorption-compression chillers for providing refrigeration.

BACKGROUND

Refrigeration process are commonly used in industries to: liquefy gases like oxygen, nitrogen, propane and methane, purify compressed air of moisture, maintain a low process temperature in oil/petrochemical/chemical processes, and for tempering metal in metallurgy industry. The chiller apparatus commonly used to obtain refrigeration are broadly based on vapor compression or vapor absorption principle. These apparatus utilize the ability of liquids or salts to absorb vapors of a working fluid and give heating and/or cooling effect.

The vapor absorption chiller apparatus are thermally driven, which means that heat from waste source or heat derived from solar collectors rather than mechanical energy is used to drive the cycle; whereas, the vapor compression chiller apparatus use high grade energy (electrical energy) from mechanical inputs. Thus, the basic difference between an absorption chiller apparatus and a compression chiller apparatus is that the compression chiller uses an electric motor for operating a compressor for raising the pressure of refrigerant vapors whereas an absorption chiller uses heat for compressing the refrigerant vapors to a high pressure. Thus, absorption chiller apparatus are more economical and environmental friendly since they employ low-grade waste heat, conserve electricity, and use non-ozone depleting refrigerants (water); however, compression chiller apparatus are more preferred due to their higher coefficient of performance (COP).

The need for energy conservation has been highlighted by concerns about the environment, leading development towards energy efficient refrigeration systems. Increased attention has been directed towards development of cost-effective and efficient systems for providing refrigeration, thus, reducing the consumption of energy/power. As a result, the absorption chiller apparatus are gaining favor over conventional compression chiller apparatus in industrial applications, as they use little energy and are environmental friendly. However, in a refrigeration system, when sub-zero evaporation temperatures are desired, a compression chiller apparatus is suitable, but, the power consumptions will be high, while, an absorption chiller apparatus cannot provide sub-zero evaporation temperatures. Also, a lithium-bromide/water based absorption chiller cannot be used where the circulated cooling water temperature is above 40[deg.] C.

In recent developments aimed at overcoming the above listed problems, absorption chillers have been combined with compression chillers to provide cooling at lowest energy costs. Such hybrid chiller, thus devised, operates the absorption chiller during high electric peak load when the charges are high, whereas the compression chiller is operated during low electric peak load when the charges are low, thereby providing a more economical system. A basic refrigeration cycle for a hybrid absorption-compression chiller uses a low temperature liquid refrigerant that absorbs heat from water, air, or any medium to be cooled, and converts to a vapor phase in an evaporator section. The refrigerant vapors are then compressed to a high pressure, by a compressor or a generator, converted back to a liquid by rejecting heat to the external surrounding, in a condenser section, and then expanded to a low-pressure mixture of liquid and vapor, that goes back to the evaporator section and the cycle is repeated.

Several attempts have been made in the past to provide a hybrid absorption-compression chiller which provides refrigeration effect. Some of the disclosures are listed in the prior art below:

U.S. Pat. No. 7,765,823 discloses a hybrid vapor compression-absorption cooling or heating system and apparatus thereof, employing a refrigerant pair comprising at least one refrigerant and at least one ionic liquid. The apparatus comprises: an absorber that forms a mixture of a refrigerant and an absorbent, a generator that heats the mixture and separates the refrigerant vapors, a condenser that receives the vapors and condenses them to a liquid, a pressure reduction device to reduce the pressure of the liquid refrigerant to form a mixture of liquid and vapor refrigerant, an evaporator that receives the mixture to evaporate the remaining liquid and provide a first and a second portion of refrigerant vapors, a compressor that receives the first portion of the vapors increases the pressure and passes to the condenser, a conduit that passes the second portion of the vapors to the absorber which comprises one or more ionic liquids.

U.S. Pat. No. 7,624,588 discloses a hybrid absorption-compression chiller which uses high temperature steam and medium temperature water generated in industrial processes as a heat source. The chiller comprises: a high temperature generator that uses the high temperature steam so as to exchange heat with refrigerant; a low temperature generator that uses the heat of condensation of the refrigerant steam, generated in the high temperature generator, so as to exchange heat with the refrigerant; a generator that uses medium temperature water to exchange heat with refrigerant; a hybrid condenser for condensing the refrigerants; an evaporator that uses the latent heat of vaporization of the condensed refrigerant to obtain chilled water; and an absorber that receives a strong solution and absorbs the refrigerant steam to produce a weak solution.

U.S. Pat. No. 3,824,804 discloses a refrigerating machine which is a combination of a compression type refrigerating apparatus and an absorption type refrigerating apparatus. The compression type refrigerating apparatus comprises a compressor, a condenser, a throttle valve, and an evaporator connected in series to form a first closed loop. The absorption type refrigerating apparatus comprises a generator, a condenser, an evaporator, and an absorber connected in series so as to form a second closed loop. The generator and the evaporator of the absorption apparatus are arranged as a heat exchanger. By combining the generator and the compressor into a unit a decrease in temperature can be obtained in the outlet valve of the compressor.

The hybrid absorption-compression chillers disclosed above are complex and/or are not operable at sub-zero evaporation temperatures. Therefore, there is felt a need for a hybrid absorption-compression chiller which while having a simple construction, providing higher COP and giving energy savings, is also adaptable over a wide range of operating conditions and subzero evaporation temperatures.

OBJECTS OF THE INVENTION

An object of the invention is to provide a hybrid absorption-compression chiller giving high coefficient of performance (COP) with low energy input.

Yet another object of the invention is to provide a hybrid absorption-compression chiller which conserves electricity and reduces total dependency on grid power.

One more object of the invention is to provide a hybrid absorption-compression chiller in which the energy consumption is optimum over a wide range of refrigeration temperatures including sub-zero condition.

Still one more object of the invention is to provide a hybrid absorption-compression chiller which is adaptable over a broad range of operating conditions and sub-zero evaporation temperatures.

SUMMARY OF THE INVENTION in accordance with the present invention, is provided a hybrid absorption-compression chiller having:

a vapor-compression system comprising: —a primary evaporator adapted to provide refrigeration by extracting heat from a medium to be cooled for vaporizing a cold condensed primary refrigerant;

a compressor in communication with said primary evaporator to receive primary refrigerant vapors, said compressor being adapted to generate high pressure primary refrigerant vapors; and a vapor-absorption system provided in operative communication with said vapor-compression system for receiving the high pressure primary refrigerant vapors, said vapor-absorption system comprising:

a secondary evaporator for receiving the high pressure primary refrigerant vapors through the evaporator tubes, said secondary evaporator having a first sprayer (S1) for spraying a condensed secondary refrigerant under low pressure conditions in said secondary evaporator, wherein said secondary evaporator is adapted to extract heat from the high pressure primary refrigerant vapors to vaporize the condensed secondary refrigerant, thereby generating a cold condensed primary refrigerant and secondary refrigerant vapors; and an absorber in operative communication with said secondary evaporator for receiving the secondary refrigerant vapors, said absorber having a second sprayer (S2) for spraying a concentrated Li—Br solution in said absorber, wherein said absorber is adapted to absorb the secondary refrigerant vapors in the concentrated Li—Br solution to generate a dilute Li—Br solution.

Typically, in accordance with the present invention, the cold condensed primary refrigerant from said secondary evaporator is conveyed to said primary evaporator via an expansion valve.

Preferably, in accordance with the present invention, the dilute Li—Br solution from said absorber is heated by passing through at least one device selected from the group consisting of a low temperature heat exchanger, a high temperature heat exchanger, a drain heat exchanger and a heat reclaimer to obtain a heated dilute Li—Br solution.

Typically, in accordance with the present invention, the heated dilute Li—Br solution is concentrated in at least one device selected from the group consisting of a high temperature generator and a low temperature generator by providing a heat input to obtain a heated concentrated Li—Br solution and secondary refrigerant vapors.

Preferably, in accordance with the present invention, the secondary refrigerant vapors are cooled in at least one device selected from the group consisting, of said low temperature generator and said drain heat exchanger to obtain a cooled condensed secondary refrigerant.

Typically, in accordance with the present invention, the cooled condensed secondary refrigerant is further condensed in a condenser to obtain the condensed secondary refrigerant. Preferably, in accordance with the present invention, the heated concentrated Li—Br solution is cooled by passing through at least one device selected from the group consisting of said low temperature heat exchanger and said high temperature heat exchanger to obtain the concentrated Li—Br solution.

In accordance with the present invention is provided a method for generating refrigeration effect, said method comprising the steps of:

providing refrigeration in a vapor-compression system by extracting heat from a medium to be cooled for vaporizing a cold condensed primary refrigerant in a primary evaporator to obtain a cooled medium and primary refrigerant vapors;

compressing the primary refrigerant vapors in a compressor to obtain high pressure primary refrigerant vapors;

receiving the high pressure primary refrigerant vapors through the tubes of a secondary evaporator of a vapor-absorption system;

providing further refrigeration by extracting heat from the high pressure primary refrigerant vapors in a condensed secondary refrigerant by spraying the condensed secondary refrigerant through a first sprayer (S1) in said secondary evaporator under low pressure conditions to generate a cold condensed primary refrigerant and secondary refrigerant vapors;

absorbing the secondary refrigerant vapors in a concentrated Li—Br solution by spraying the concentrated Li—Br solution through a second sprayer (S2) in an absorber, thereby generating a dilute Li—Br solution; and recirculating the cold condensed primary refrigerant to said primary evaporator via an expansion valve, thereby completing the refrigeration cycle. Typically, in accordance with the present invention, the cold condensed primary refrigerant is at least one selected from the group consisting of tetrafluoroethane (R134a), dichlorotrifluoroethane (R123), trifluoroethane (R143a), and carbon dioxide (R744).

Preferably, in accordance with the present invention, the condensed secondary refrigerant is water.

Typically, in accordance with the present invention, the dilute Li—Br solution leaving the absorber is heated to obtain a heated dilute Li—Br solution.

Preferably, in accordance with the present invention, the heated dilute Li—Br solution is concentrated by providing a heal: input to obtain a heated concentrated Li—Br solution and secondary refrigerant vapors.

Typically, in accordance with the present invention, the heated concentrated Li—Br solution is cooled to obtain the concentrated Li—Br solution.

Preferably, in accordance with the present invention, the secondary refrigerant vapors are cooled and condensed to obtain the condensed secondary refrigerant.

BRIEF DESCRIPTION OF THE ACCOMPANYING DRAWINGS

The invention will now be described with the help of the accompanying drawings, in which, FIG. 1 illustrates an embodiment of the hybrid absorption-compression chiller in accordance with the present invention;

DETAILED DESCRIPTION OF THE INVENTION

Figure 1:
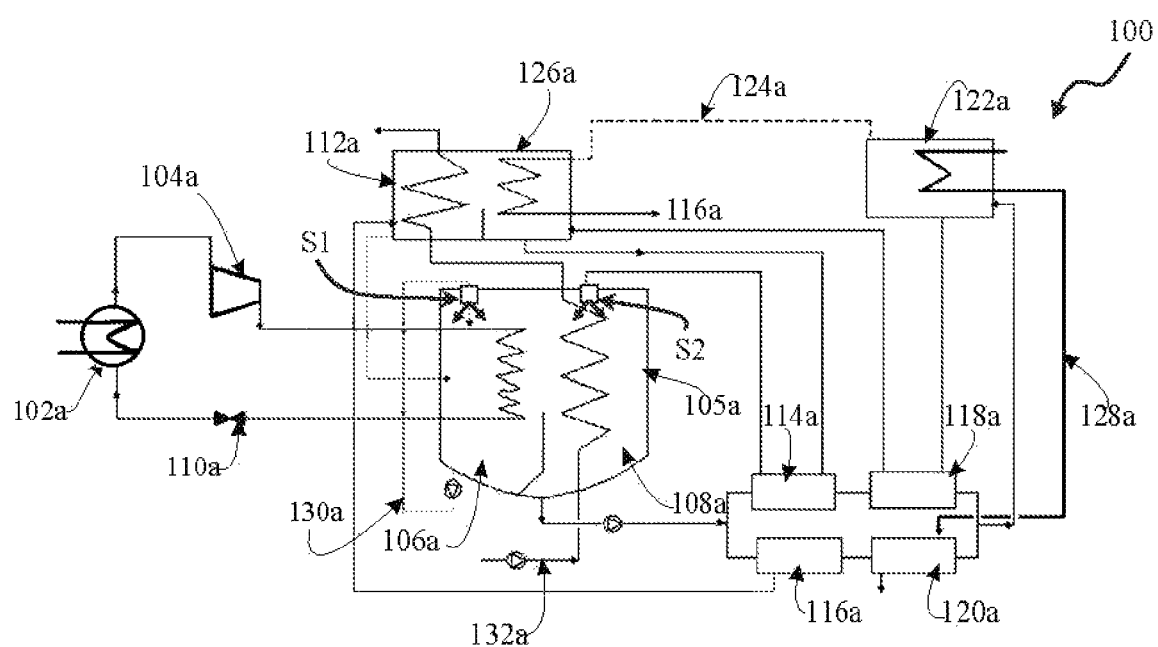

The present invention will now be described with reference to the accompanying drawings which do not limit the scope and ambit of the invention. The description provided is purely by way of example and illustration.

The present invention envisages a hybrid absorption-compression chiller comprising a vapor-compression system providing refrigeration effect in a primary evaporator by extracting heat from a medium to be cooled in a condensed primary refrigerant, typically selected from tetrafluoroethane (R134a), dichlorotrifluoroethane (R123), trifluoroethane (R143a), and carbon dioxide (R744), and a vapor-absorption system in operative communication with the vapor-compression system for receiving primary refrigerant vapors via a compressor, the vapors are cooled by a condensed secondary refrigerant, typically water, to provide the condensed primary refrigerant which is recycled to the vapor-compression system.

The hybrid absorption-compression chiller of the present invention is energy-efficient and provides a higher COP in comparison with the conventional chillers.

The hybrid absorption-compression chiller of the present invention comprises: a primary evaporator 102, a compressor 104, a secondary evaporator 106, a condenser 112, a low pressure absorber 108, an expansion valve 110, a low temperature heat exchanger 114, a drain heat exchange 116, a high temperature heat exchanger 118, a high temperature generator 122, and a low temperature generator 126, and optionally comprising a heal: reclaimer 120. The various embodiments of the present invention, illustrated in the FIGS. 1-4, are described herein below; wherein the above-listed components are particularly denoted by alphabets a, b, c & d in FIGS. 1, 2, 3 & 4, respectively.

The chiller of the present invention having: a first loop comprising the primary evaporator 102, the compressor 104, the secondary evaporator 106, and the expansion valve 110; and a second loop comprising the condenser 112, the secondary evaporator 106, and the low pressure absorber 108. The first loop and the second loop collectively form a vapor-compression system and a vapor-absorption system, wherein the vapor-compression system comprises the primary evaporator 102, the compressor 104, and the expansion valve 110, and the vapor-absorption system comprises the condenser 112, the secondary evaporator 106, and the low pressure absorber 108. In the vapor-compression system, the primary evaporator 102 receives a cold condensed primary refrigerant, typically selected from tetrafluoroethane (R134a), dichlorotrifluoroethane (R123), trifluoroethane (R143a), and carbon dioxide (R744). The cold condensed primary refrigerant extracts heat from the medium to be cooled in the chamber of the primary evaporator 102, forming primary refrigerant vapors. The primary refrigerant vapors are communicated from the primary evaporator 102 to the compressor 104, where the pressure is raised, to provide high pressure primary refrigerant vapors. The high pressure primary refrigerant vapors are received through the tubes of the secondary evaporator 106 of the vapor-absorption system. In the vapor-absorption system under low pressure conditions, a low temperature condensed secondary refrigerant, typically water, received from the condenser 112, is sprayed in the secondary evaporator 106 via a first sprayer (S1). The condensed secondary refrigerant extracts heat from the high pressure primary refrigerant vapors, generating secondary refrigerant vapors and resulting in cooling of the high pressure primary refrigerant vapors thereby providing a cooled condensed primary refrigerant. The cooled condensed primary refrigerant is discharged through the evaporator tubes of the secondary evaporator 106 and recirculated to the primary evaporator 102 through the expansion valve 110 which controls the flow rate of the cooled condensed primary refrigerant. While passing through the expansion valve 110 the condensed primary refrigerant undergoes an abrupt reduction in pressure which causes flash evaporation of a part of the condensed primary refrigerant to give a liquid-vapor mixture having lower temperature. This cold liquid-vapor mixture is recirculated to the primary evaporator 102 thereby completing the first loop.

The secondary refrigerant vapors are absorbed by a concentrated refrigerant-absorbent solution (about 63%), typically lithium-bromide (LiBr) Avater, sprayed in the low pressure absorber 108 via a second sprayer (S2), wherein the absorber 108 is provided in operative communication with the secondary evaporator 106 to receive the secondary refrigerant vapors. Thus, generating a dilute refrigerant-absorbent solution (about 57%) and completing the second loop. To remove the heat of dilution generated during the absorption of the refrigerant vapors in the absorber 108, cooling water having temperature between 50-60[deg.] C., is circulated through the tubes of the absorber 108 via the line 132. During start-up of the hybrid chiller, water is sprayed on the secondary evaporator 106 through a circulation line 130. The dilute refrigerant-absorbent solution so obtained is discharged from the absorber 108 and concentrated before recirculating to the low pressure absorber 108.

The dilute refrigerant-absorbent solution, leaving the absorber 108, is first heated in at least one equipment selected from the group consisting of low temperature heat exchanger 114, the drain heat exchanger 116, the high temperature heat exchanger 118, and the heat reclaimer 120. The heated dilute refrigerant-absorbent solution is then concentrated in at least one equipment selected from group consisting of the high temperature generator 122 and the low temperature generator 126. FIGS. 1-4 illustrate the various embodiments of the hybrid absorption-compression chiller in accordance with the present invention, wherein the embodiments vary in the manner in which the dilute refrigerant-absorbent solution, leaving the absorber 108, is heated and concentrated.

Referring to FIG. 1, therein is illustrated a first embodiment of the hybrid chiller of the present invention; the embodiment being represented by numeral 100 in FIG. 1. In the hybrid chiller 100, the dilute refrigerant-absorbent solution leaving the absorber 108a is bifurcated, a first stream is fed to the low temperature heat exchanger 114a and a second stream is fed to the drain heat exchanger 116a, where the dilute refrigerant-absorbent solution gains heat to become partly heated. The partly heated first stream is received in the high temperature heat exchanger 118a from the low temperature heat exchanger 114a and the partly heated second stream is received in the heat reclaimer 120a from the drain heat exchanger 116a. In the high temperature heat exchanger 118a and the heat reclaimer 120a, the partly heated first stream and the partly heated second stream of the dilute refrigerant-absorbent solution gets further heated, to provide a heated first stream and a heated second stream of the dilute refrigerant-absorbent solution. The heated first stream and the heated second stream of the dilute refrigerant-absorbent solution, is combined, and conveyed to the high temperature generator 122a. The high temperature generator 122a is adapted to boil the heated dilute refrigerant-absorbent solution received therein, by using a heat input, received through line 128a, so as to vaporize the refrigerant from the dilute refrigerant-absorbent solution, and provide a heated moderately concentrated refrigerant-absorbent solution and secondary refrigerant vapors. The heated moderately concentrated refrigerant-absorbent solution is circulated through the high temperature heat exchanger 118a, where it rejects partial heat to the partly heated first stream of the dilute refrigerant-absorbent solution, to become partly heated moderately concentrated refrigerant-absorbent solution.

The low temperature generator 126a receives the partly heated moderately concentrated refrigerant-absorbent solution, and the secondary refrigerant vapors via the line 124 as a heat source for further concentrating the partly heated moderately concentrated refrigerant-absorbent solution. The heat from the secondary refrigerant vapors is extracted by the partly heated moderately concentrated refrigerant-absorbent solution; so as to provide a concentrated partly heated refrigerant-absorbent solution and a secondary refrigerant condensate. The concentrated partly heated refrigerant-absorbent solution is circulated through the low temperature heat exchanger 114a, where it rejects heat to the first stream of the dilute refrigerant-absorbent solution, to become the concentrated refrigerant-absorbent solution, which is sprayed in the absorber 108. The secondary refrigerant condensate is circulated through the drain heat exchanger 116a, where it rejects heat to the second stream of the dilute refrigerant-absorbent solution, to provide a cooled secondary refrigerant condensate. The cooled secondary refrigerant condensate is conveyed to the condenser 112a, where it further condenses to provide the low temperature condensed secondary refrigerant, which is sprayed in the secondary evaporator 106a, thereby completing the second loop.

In the hybrid chiller 100, the heat reclaimer 120a is adapted to extract the left-over heat from the used heat input 128, leaving the high temperature generator 122a. The heat reclaimer 120a is only provided when the heat input 128a is steam, in which case, heat is extracted from the steam condensate discharged from the high temperature generator 122a.

Figure 2:
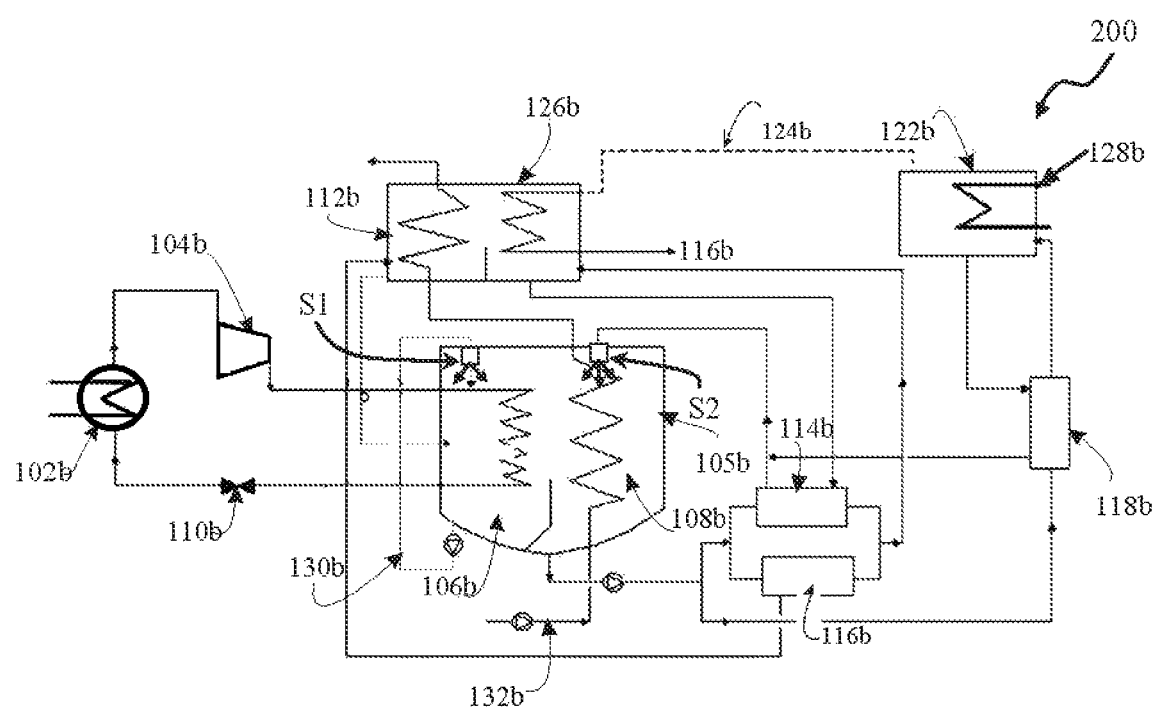
FIG. 2 illustrates another embodiment of the hybrid absorption-compression chiller in accordance with the present invention.

Referring to FIG. 2, therein is illustrated another embodiment of the present invention, this embodiment being represented by numeral 200 in FIG. 2, in the hybrid chiller 200, the heat reclaimer 120 is not provided and the dilute refrigerant-absorbent solution is simultaneously concentrated in the high temperature generator 122b and the low temperature generator 126b. The dilute refrigerant-absorbent solution leaving the absorber 108b is bifurcated into a first stream and a second stream.

The first stream of the dilute refrigerant-absorbent solution is again bifurcated into a first part and a second part, wherein the first part of the dilute refrigerant-absorbent solution is fed to the low temperature heat exchanger 114b and the second part of the dilute refrigerant-absorbent solution is fed to the drain heat exchanger 116b. In the low temperature heat exchanger 114b and the drain heat exchanger 116b, the first part and the second part of the dilute refrigerant-absorbent solution gains heat, to become partly heated. The partly heated first part of the dilute refrigerant-absorbent solution from the low temperature heat exchanger 114b and the partly heated second part of the dilute refrigerant-absorbent solution from the drain heat exchanger 116b is combined and fed to the low temperature generator 126b. The second stream of the dilute refrigerant-absorbent solution is fed to the high temperature generator 122b via the high temperature heat exchanger 118b, where, in the high temperature heat exchanger 118b, the dilute refrigerant-absorbent solution gains heat to become a heated dilute refrigerant-absorbent solution. The heated dilute refrigerant-absorbent solution is boiled in the high temperature generator 122b using the heat input 128b, so as to vaporize the refrigerant, to provide a concentrated heated refrigerant-absorbent solution and secondary refrigerant vapors. The concentrated heated refrigerant-absorbent solution is circulated through the high temperature heat exchanger 118b, where it rejects heat to the second stream of the dilute refrigerant-absorbent solution, to become a first portion of concentrated refrigerant-absorbent solution.

The secondary refrigerant vapors are received in the low temperature generator 126b via line 124b, where it acts as a heat source for concentrating the partly heated dilute refrigerant-absorbent solution received therein, to provide a concentrated partly heated refrigerant-absorbent solution and a secondary refrigerant condensate. The concentrated partly heated refrigerant-absorbent solution rejects heat in the low temperature heat exchanger 114b to the first part of the dilute refrigerant-absorbent solution, to become a second portion of concentrated refrigerant-absorbent solution. The first portion and the second portion of concentrated refrigerant-absorbent solution are combined and sprayed in the absorber 108b. The secondary refrigerant condensate is circulated through the drain heat exchanger 116b, where it rejects heat to the second part of the dilute refrigerant-absorbent solution, to become a cooled secondary refrigerant condensate. The cooled secondary refrigerant condensate is conveyed to the condenser 112b, where it further condenses, to provide the low temperature condensed secondary refrigerant, which is sprayed in the secondary evaporator 106b via a first sprayer (S1), thereby completing the second loop.

Figure 3:
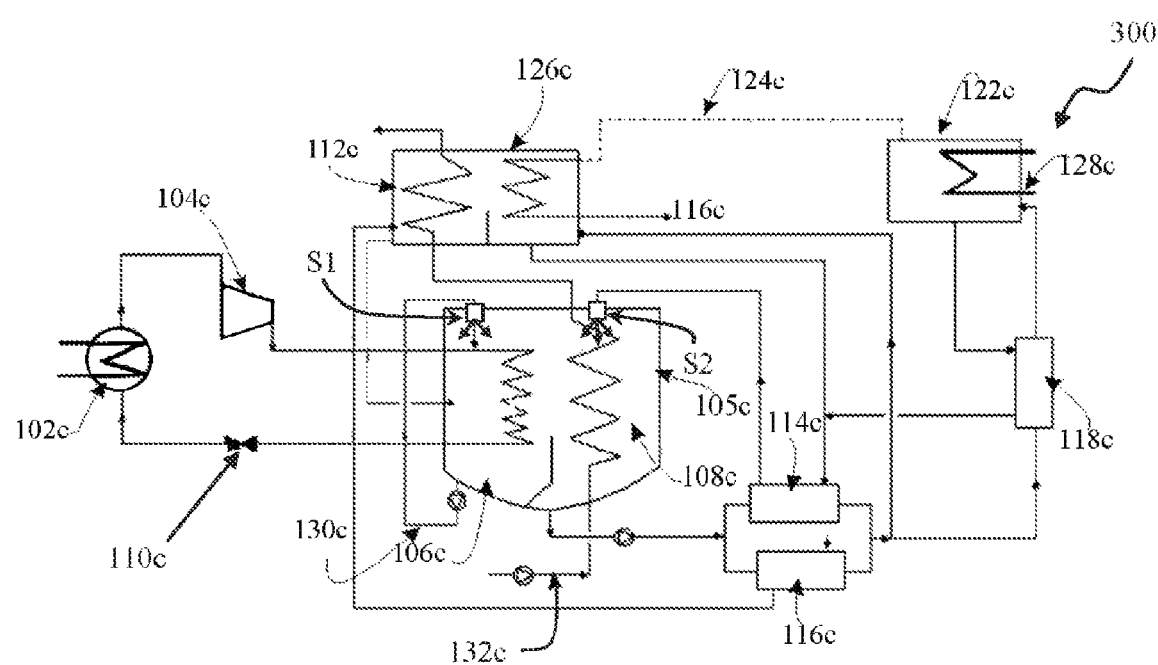
FIG. 3 illustrates yet another embodiment of the hybrid absorption-compression chiller in accordance with the present invention.

Referring to FIG. 3, therein is illustrated yet another embodiment of the present invention, this embodiment being represented by numeral 300 in FIG. 3. In the hybrid chiller 300, the heat reclaimer 120 is not provided and the dilute refrigerant-absorbent solution is simultaneously concentrated in the high temperature generator 122c and the low temperature generator 126c. The dilute refrigerant-absorbent solution leaving the absorber 108c is bifurcated, a first stream is fed to the low temperature heat exchanger 114c and a second stream is fed to the drain heat exchanger 116c, where the dilute refrigerant-absorbent solution gains heat to become partly heated. The partly heated first stream and the partly heated second stream of the dilute refrigerant-absorbent solution, leaving the low temperature heat exchanger 114c and the drain heat exchanger 116c, respectively, are combined, to provide a single stream of partly heated dilute refrigerant-absorbent solution. This single stream is bifurcated into a first portion and a second portion, wherein the first portion of partly heated dilute refrigerant-absorbent solution is conveyed to the low temperature generator 126c and the second portion of partly heated dilute refrigerant-absorbent solution is circulated through the high temperature heat exchanger 118c. In the high temperature heat exchanger 118c, the second portion of the partly heated dilute refrigerant-absorbent solution gains heat, to become a heated dilute refrigerant-absorbent solution. The heated dilute refrigerant-absorbent solution is conveyed to the high temperature generator 122c, where by using the heat input 128c, the heated dilute refrigerant-absorbent solution is boiled so as to vaporize the refrigerant, and provide a concentrated heated refrigerant-absorbent solution and secondary refrigerant vapors. The concentrated heated refrigerant-absorbent solution is circulated through the high temperature heat exchanger 118c, where it rejects partial heat to the second portion of partly heated dilute refrigerant-absorbent solution, to become a first stream of concentrated partly heated refrigerant-absorbent solution.

The secondary refrigerant vapors are received in the low temperature generator 126c via line 124c, where the vapors act as a heat source for concentrating the first portion of partly heated dilute refrigerant-absorbent solution received therein, and provide a second stream of concentrated partly heated refrigerant-absorbent solution and a secondary refrigerant condensate. The first stream and the second stream of the concentrated partly heated refrigerant-absorbent solution are combined and circulated through the low temperature heat exchanger 114c, wherein the concentrated partly heated refrigerant-absorbent solution rejects heat in the low temperature heat exchanger 114c to the first stream of the dilute refrigerant-absorbent solution, to become a concentrated refrigerant-absorbent solution which is sprayed in the absorber 108c via a second sprayer (S2). The secondary refrigerant condensate is circulated through the drain heat exchanger 116c, where it rejects heat to the second stream of the dilute refrigerant-absorbent solution, to become cooled secondary refrigerant condensate. The cooled secondary refrigerant condensate is conveyed to the condenser 112x, where it further condenses, to provide the low temperature condensed secondary refrigerant, which is sprayed in the secondary evaporator 106c, thereby completing the second loop.

Figure 4:
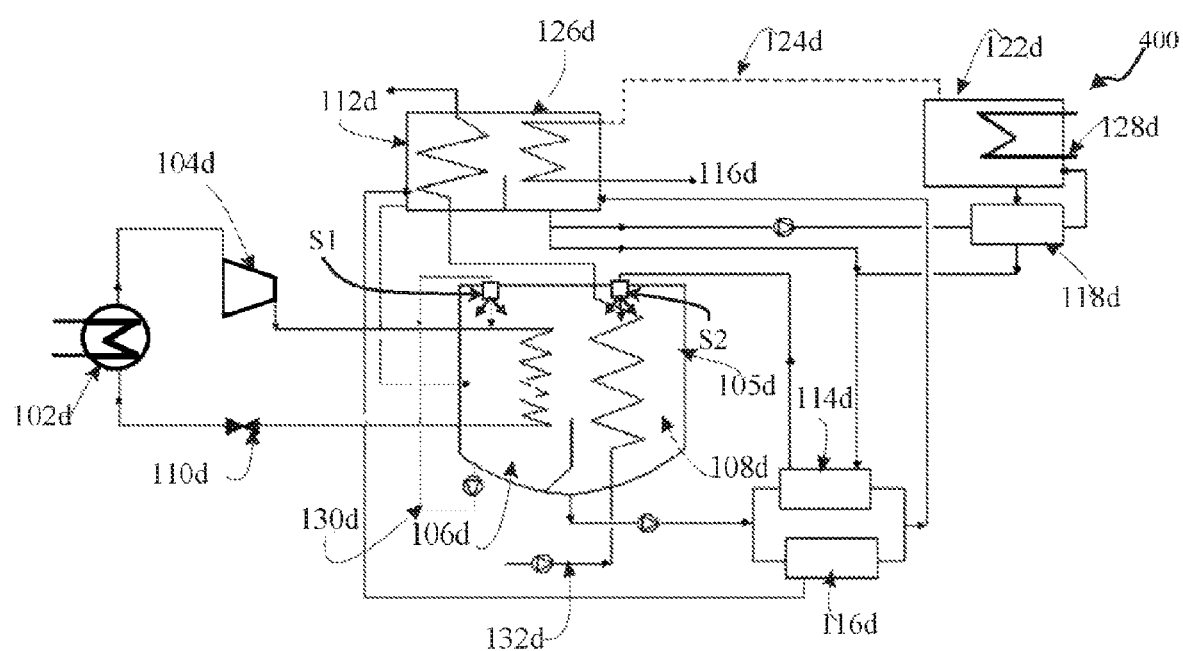
FIG. 4 illustrates still another embodiment of the hybrid absorption-compression chiller in accordance with the present invention.

Referring to FIG. 4, therein is illustrated still another embodiment of the present invention, this embodiment being represented by numeral 400 in FIG. 4. In the hybrid chiller 400, the heat reclaimer 120 is not provided and the dilute refrigerant-absorbent solution is first concentrated in the low temperature generator 126d and then only a portion is further concentrated in the high temperature generator 122d. The dilute refrigerant-absorbent solution leaving the absorber 108d is bifurcated, a first stream is fed to the low temperature heat exchanger 114d and a second stream is fed to the drain heat exchanger 116d, where the dilute refrigerant-absorbent solution gains heat to become partly heated. The partly heated first stream and the partly heated second stream of the dilute refrigerant-absorbent solution, leaving the low temperature heat exchanger 114d and the drain heat exchanger 116d, respectively, are combined, to provide a single stream of partly heated dilute refrigerant-absorbent solution. This single stream of partly heated dilute refrigerant-absorbent solution is conveyed to the low temperature generator 126d, where, by extracting heat from a heat source, the partly heated dilute refrigerant-absorbent solution gets moderately concentrated, to provide a moderately concentrated partly heated refrigerant-absorbent solution. The moderately concentrated partly heated refrigerant-absorbent solution, generated in the low temperature generator 126d, is bifurcated, where, a first portion is circulated through the high temperature heat exchanger 118d and a second portion is circulated through the low temperature heat exchanger 114d.

The first portion of the moderately concentrated partly heated refrigerant-absorbent solution gains heat in the high temperature heat exchanger 118d, to become a moderately concentrated heated refrigerant-absorbent solution, which is conveyed to the high temperature generator 122d, where, by using heat from the heat input 128d, the refrigerant is vaporized, to provide a concentrated heated refrigerant-absorbent solution and secondary refrigerant vapors which are fed to the low temperature generator 126d as the heat source. The concentrated heated refrigerant-absorbent solution is circulated through the high temperature heat exchanger 118d, where, it rejects partial heat to the moderately concentrated partly heated refrigerant-absorbent solution, to become a concentrated partly heated refrigerant absorbent solution. This concentrated partly heated refrigerant-absorbent solution is combined with the second portion of moderately concentrated partly heated refrigerant-absorbent solution leaving the low temperature generator 126d, and the mixture is circulated through the low temperature heat exchanger 114d, where it rejects heat to the first stream of dilute refrigerant-absorbent solution, to become a concentrated refrigerant-absorbent solution, which is sprayed in the absorber 108d via a second sprayer (S2). The secondary refrigerant vapors condense in the low temperature generator 126d to provide a secondary refrigerant condensate. The secondary refrigerant condensate is circulated through the drain heat exchanger 116d, where it rejects heat to the second stream of the dilute refrigerant-absorbent solution, to become cooled secondary refrigerant condensate. The cooled secondary refrigerant condensate is conveyed to the condenser 112d, where it further condenses, to provide the low temperature condensed secondary refrigerant, which is sprayed in the secondary evaporator 106d, thereby completing the second loop.

Technical Advantages

A hybrid absorption-compression chiller for providing refrigeration as described in the present disclosure has several technical advantages including but not limited to the realization of: —the hybrid abso tion compression chiller provides a COP in the range of 1.0-1.2, which is higher than the COP of conventional chillers;

the hybrid absorption-compression chiller provides up to 60% energy savings in comparison with the conventional chillers; and the hybrid absorption-compression chiller provides sub-zero evaporation temperatures by using low grade energy, and thereby reducing the total dependency on grid power.

In view of the wide variety of embodiments to which the principles of the present invention can be applied, it should be understood that the illustrated embodiments are exemplary only. The numerical values given of various physical parameters and dimensions are only approximations and it is envisaged that the values higher or lower than the numerical values assigned to the parameters, dimensions and quantities fall within the scope of the invention.

While considerable emphasis has been placed herein on the components and component parts of the preferred embodiments, it will be appreciated that many embodiments can be made and that many changes can be made in the preferred embodiments without departing from the principles of the invention. These and other changes in the preferred embodiment as well as other embodiments of the invention will be apparent to those skilled in the art from the disclosure herein, whereby it is to be distinctly understood that the foregoing descriptive matter is to be interpreted merely as illustrative of the invention and not as a limitation.

The invention claimed is:

1. A hybrid absorption-compression chiller having:
   a vapor-compression system comprising:
      a primary evaporator adapted to provide refrigeration by extracting heat from a medium to be cooled for vaporizing a cold condensed primary refrigerant;
      a compressor in communication with said primary evaporator to receive primary refrigerant vapors, said compressor being adapted to generate high pressure primary refrigerant vapors; and
   a vapor-absorption system provided in operative communication with said vapor-compression system for receiving the high pressure primary refrigerant vapors, said vapor-absorption system comprising:
      a secondary evaporator for receiving the high pressure primary refrigerant vapors through evaporator tubes, said secondary evaporator having a first sprayer for spraying a condensed secondary refrigerant under low pressure conditions in said secondary evaporator, wherein said secondary evaporator is adapted to extract heat from the high pressure primary refrigerant vapors to vaporize the condensed secondary refrigerant, thereby generating the cold condensed primary refrigerant and secondary refrigerant vapors; and an absorber in operative communication with said secondary evaporator for receiving the secondary refrigerant vapors, said absorber having a second sprayer for spraying a concentrated Li—Br solution in said absorber, wherein said absorber is adapted to absorb the secondary refrigerant vapors in the concentrated Li—Br solution to generate dilute Li—Br solution.

2. The hybrid absorption-compressor chiller as claimed in claim 1, wherein the cold condensed primary refrigerant from said secondary evaporator is conveyed to said primary evaporator via an expansion valve.

3. The hybrid absorption-compression chiller as claimed in claim 1, wherein the dilute Li—Br solution from said absorber is heated by passing through at least one device selected from the group consisting of a low temperature heat exchanger, a high temperature heat exchanger, a drain heat exchanger and a heat reclaimer to obtain heated dilute Li—Br solution.

4. The hybrid absorption-compression chiller as claimed in claim 3, wherein the heated dilute Li—Br solution is concentrated in at least one device selected from the group consisting of a high temperature generator and a low temperature generator by using a heat input to obtain heated concentrated Li—Br solution and secondary refrigerant vapors.

5. The hybrid absorption-compression chiller as claimed in claim 4, wherein the secondary refrigerant vapors are cooled in at least one device selected from the group consisting of said low temperature generator and said drain heat exchanger to obtain cooled condensed secondary refrigerant.

6. The hybrid absorption-compression chiller as claimed in claim 5, wherein the cooled condensed secondary refrigerant is further condensed in a condenser to obtain the condensed secondary refrigerant.

7. The hybrid absorption-compression chiller as claimed in claim 4, wherein the heated concentrated Li—Br solution is cooled by passing through at least one device selected from the group consisting of said low temperature heat exchanger and said high temperature heat exchanger to obtain the concentrated Li—Br solution.

8. A method for providing refrigeration effect, said method comprising the steps of:

providing refrigeration in a vapor-compression system by extracting heat from a medium to be cooled for vaporizing a cold condensed primary refrigerant in a primary evaporator to obtain a cooled medium and primary refrigerant vapors;

compressing the primary refrigerant vapors in a compressor to obtain high pressure primary refrigerant vapors;

receiving the high pressure primary refrigerant vapors through tubes of a secondary evaporator of a vapor-absorption system;

providing further refrigeration by extracting heat from the high pressure primary refrigerant vapors in a condensed secondary refrigerant by spraying the condensed secondary refrigerant through a first sprayer in said secondary evaporator under low pressure conditions to generate a cold condensed primary refrigerant and secondary refrigerant vapors;

absorbing the secondary refrigerant vapors in a concentrated Li—Br solution by spraying the concentrated Li—Br solution through a second sprayer an absorber, thereby generating a dilute Li—Br solution; and recirculating the cold condensed primary refrigerant to said primary evaporator via an expansion valve, thereby completing the refrigeration cycle.

9. The method as claimed in claim 8, wherein the cold condensed primary refrigerant is at least one selected from the group consisting of tetrafluoroethane, dichlorotrifluoroethane, trifluoroethane, and carbon dioxide.

10. The method as claimed in claim 8, wherein the condensed secondary refrigerant is water.

11. The method as claimed in claim 8, wherein the dilute Li—Br solution from the absorber is heated to obtain a heated dilute Li—Br solution.

12. The method as claimed in claim 11, wherein the heated dilute Li—Br solution is concentrated by using a heat input to obtain a heated concentrated Li—Br solution and secondary refrigerant vapors.

13. The method as claimed in claim 12, wherein the heated concentrated Li—Br solution is cooled to obtain the concentrated Li—Br solution.

14. The method as claimed in claim 12, wherein the secondary refrigerant vapors are cooled and condensed to obtain the condensed secondary refrigerant.

* * * * *